United States Patent
Vura et al.

(10) Patent No.: US 10,455,588 B2
(45) Date of Patent: Oct. 22, 2019

(54) DEVICES AND METHODS FOR RESOURCE SELECTION IN WIRELESS COMMUNICATIONS

(71) Applicant: Intel Corporation, Santa Clara, CA (US)

(72) Inventors: Pravallika Vura, Bangalore (IN); Soumen Chakraborty, Bangalore (IN)

(73) Assignee: Intel Corporation, Santa Clara, CA (US)

(*) Notice: Subject to any disclaimer, the term of this patent is extended or adjusted under 35 U.S.C. 154(b) by 96 days.

(21) Appl. No.: 15/719,598

(22) Filed: Sep. 29, 2017

(65) Prior Publication Data
US 2019/0104512 A1   Apr. 4, 2019

(51) Int. Cl.
*H04W 72/06* (2009.01)
*H04W 72/04* (2009.01)
*H04W 72/02* (2009.01)
*H04W 64/00* (2009.01)
*H04W 72/08* (2009.01)

(52) U.S. Cl.
CPC ......... *H04W 72/048* (2013.01); *H04W 64/00* (2013.01); *H04W 72/02* (2013.01); *H04W 72/046* (2013.01); *H04W 72/085* (2013.01)

(58) Field of Classification Search
CPC ..... H04W 72/06; H04W 64/00; H04W 88/02; H04W 72/02; H04W 64/006; H04W 76/14; H04W 72/048; H04W 8/005; H04W 72/08; H04W 48/12; H04W 4/80; H04W 4/70; H04W 76/27; H04W 48/16; H04W 4/023; Y02D 70/126; Y02D 70/122
See application file for complete search history.

(56) References Cited

U.S. PATENT DOCUMENTS

| | | | |
|---|---|---|---|
| 2015/0043448 A1* | 2/2015 | Chatterjee | H04W 8/005 370/329 |
| 2017/0094657 A1* | 3/2017 | Yoon | H04L 5/0012 |
| 2017/0099624 A1* | 4/2017 | Baghel | H04W 4/70 |
| 2017/0201461 A1* | 7/2017 | Cheng | H04L 47/32 |
| 2017/0245245 A1* | 8/2017 | Kim | H04W 72/1284 |
| 2017/0280406 A1* | 9/2017 | Sheng | H04W 4/70 |
| 2017/0280445 A1* | 9/2017 | Jiang | H04L 47/27 |
| 2017/0289986 A1* | 10/2017 | Jin | H04W 72/042 |
| 2017/0295579 A1* | 10/2017 | Sheng | H04W 72/02 |

* cited by examiner

*Primary Examiner* — Jung Liu
(74) *Attorney, Agent, or Firm* — Viering, Jentschura & Partner MBB

(57) ABSTRACT

Devices and methods configured to receive a first information from a cell, the first information comprising boundaries of a plurality of zones of the cell, wherein each of the plurality of zones is allocated a respective set of resources; select a first zone of the plurality of zones based on a position calculated from a second information; select a second zone of the plurality of zones based on a deviation value of at least one of the position or the first information; compare a contention in resources of the first zone to a contention in resources of the second zone; and transmit a message based on the comparison.

20 Claims, 12 Drawing Sheets

DEVICES AND METHODS FOR RESOURCE SELECTION IN WIRELESS COMMUNICATIONS

TECHNICAL FIELD

Various embodiments relate generally to wireless communications.

BACKGROUND

As part of Device-to-Device (D2D) and Vehicle-to-Everything (V2X) features, the network configures common resource pools to use for D2D discovery and V2X communications. In order to decrease or mitigate chances of contention in resources or resource conflicts, the resources for the resource pool allocated to each of D2D and V2X communications are distributed to pre-determined zones instead of having a single common resource pool for the entire cell. In D2D, these zones are circular and user equipment (UE) identifies its zone based on a Reference Signal Received Power (RSRP) measurement. In V2X, these zones are rectangular and the UE (e.g. a vehicular communication device) identifies its zone based on its location (e.g. geographic position determined from a Global Navigation Satellite System).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
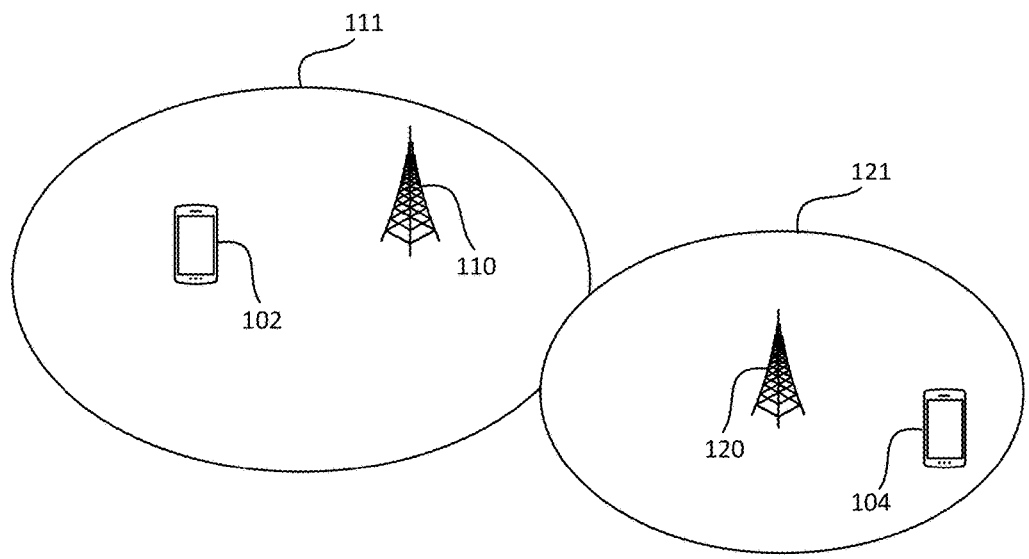
FIG. 1 shows an exemplary radio communication network according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

The terms "circuit" or "circuitry" as used herein are understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "software" refers to any type of executable instruction, including firmware.

The term "terminal device" utilized herein refers to user-side devices (both mobile and immobile) that can connect to a core network and various external networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld electronic devices, consumer/home/office/commercial appliances, vehicles, and any other electronic device capable of user-side wireless communications. Without loss of generality, in some cases terminal devices can also include application-layer components, such as application processors or other general processing components, which are directed to functionality other than wireless communications. Terminal devices can also support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with other networks through the network access node. "Network access nodes" can include any type of base station or access point, including macro base stations, micro base stations, NodeBs, evolved NodeBs (eNodeBs or eNBs), Home eNodeBs, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, mobile cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where each cell is characterized by a distinct communication channel. Furthermore, the term "cell" may be utilized to refer to any of a macrocell, microcell, femtocell, picocell, etc. Certain communication devices can act as both terminal devices and network access nodes, such as a terminal device that provides a network connection for other terminal devices.

The term "vehicular communication device" refers to any type of mobile machine that is either stationary or moving, which can communicate with other stationary or mobile communication devices or communication devices that are moving. Vehicular communication devices may include dedicated communication components (for example in the manner of a terminal device, network access node, and/or relay node), that are configured to communicate with other communication devices such as terminal devices, network access nodes, and other vehicular communication devices. Vehicular communication devices can be terrestrial vehicles (e.g., automobiles, cars, trains, motorcycles, bicycles, utility vehicles, terrestrial drones or robots, or other land-based vehicles), aerospace vehicles (e.g., airplanes, helicopters, aerial drones, rockets, spacecraft, satellites, or other aeronautic or astronautic vehicles), and/or aquatic or sub-aquatic vehicles (e.g., boats, submarines, or other water/fluid-based vehicles). Vehicles can be any type of mobile machine, and may or may not transport passengers or cargo.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

Various aspects of this disclosure may utilize or be related to radio communication technologies. While some examples may refer to specific radio communication technologies, these examples are demonstrative and may be analogously applied to other radio communication technologies, including, but not limited to, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-SCDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems, and other existing, developing, or future radio communication technologies. Aspects described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

Additionally, aspects of this disclosure may relate to other forms of wireless communications, including Global Navigation Satellite System (GNSS) communications, e.g. Global Positioning System (GPS), Galileo, etc.

For purposes of this disclosure, radio communication technologies may be classified as one of a Short Range radio communication technology or Cellular Wide Area radio communication technology. Short Range radio communication technologies include Bluetooth, WLAN (e.g. according to any IEEE 802.11 standard), and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g. according to an IEEE 802.16 radio communication standard, e.g. WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples. Furthermore, as used herein the term GSM refers to both circuit- and packet-switched GSM, including, for example, GPRS, EDGE, and any other related GSM technologies. Likewise, the term UMTS refers to both circuit- and packet-switched GSM, including, for example, HSPA, HSDPA/HSUPA, HSDPA+/HSUPA+, and any other related UMTS technologies. As used herein, a first radio communication technology is different from a second radio communication technology if the first and second radio communication technologies are based on different communication standards.

The term "network" as utilized herein, e.g. in reference to a communication network such as a radio communication network, encompasses both an access section of a network (e.g. a radio access network (RAN) section) and a core section of a network (e.g. a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor may transmit or receive data in the form of radio signals with another processor, where the physical transmission and reception is handled by radio-layer components such as RF transceivers and antennas, and the logical transmission and reception is performed by the processor. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

FIG. 1 shows exemplary radio communication network 100 according to some aspects, which may include terminal devices 102 and 104 in addition to network access nodes (i.e. network access points) 110 and 120 with corresponding coverage regions (i.e. cells) 111 and 121, respectively. Communication network 100 may communicate via network access nodes 110 and 120 with terminal devices 102 and 104 via various mechanisms. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be analogously applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, e.g. for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

Figure 2:
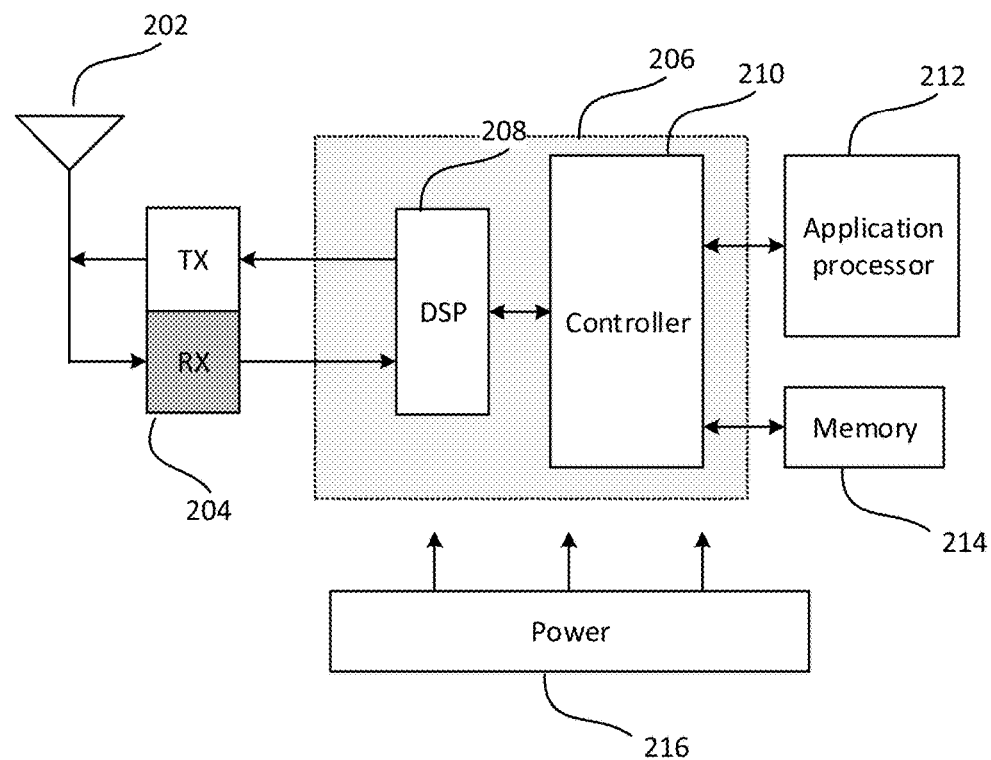
FIG. 2 shows an internal configuration of terminal device according to some aspects.

FIG. 2 shows an internal configuration of terminal device 102 according to some aspects, which may include antenna system 202, radio frequency (RF) transceiver 204, baseband modem 206 (including digital signal processor 208 and controller 210), application processor 212, memory 214, and power supply 216. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

The term "terminal device" may be used interchangeably with user equipment (UE) and is also intended to encompass vehicular communication devices in the V2X setting.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 in order to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the RF transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by controller 210 for transmission via RF transceiver 204, and, in the receive path, prepare incoming received data provided by RF transceiver 204 for processing by controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancellation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions of the radio communication technologies, while controller 210 may be responsible for upper-layer protocol stack functions. Controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Controller 210 may be structurally embodied as a protocol processor configured to execute protocol software (retrieved from a controller memory) and subsequently control the radio communication components of terminal device 102 in order to transmit and receive communication signals in accordance with the corresponding protocol control logic defined in the protocol software. Controller 210 may include one or more processors configured to retrieve and execute program code that defines the upper-layer protocol stack logic for one or more radio communication technologies, which can include Data Link Layer/Layer 2 and Network Layer/Layer 3 functions. Controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 210 may include executable instructions that define the logic of such functions.

Accordingly, baseband modem 206 may be configured to implement the methods and/or algorithms described in this disclosure.

In some aspects, terminal device 102 may be configured to transmit and receive data according to multiple radio communication technologies. Accordingly, in some aspects one or more of antenna system 202, RF transceiver 204, digital signal processor 208, and controller 210 may include separate components or instances dedicated to different radio communication technologies and/or unified components that are shared between different radio communication technologies. For example, in some aspects controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and controller 210 are shown as individual components in FIG. 3, in some aspects antenna system 202, RF transceiver 204, digital signal processor 208, and/or controller 210 can encompass separate components dedicated to different radio communication technologies.

While not shown in FIG. 2, terminal device 102 may include hardware and/or software configured to receive and process GNSS signals, e.g. GPS signals, Galileo signals, or the like. For example, terminal device 102 may further include a GNSS receiver (e.g. a GNSS antenna and GNSS signal reception circuitry) and a GNSS signal processor with corresponding interfaces to other components within terminal device 102. Accordingly, terminal device 102 may be configured to determine its geographic position based on received GNSS signals and use its position for a number of applications, including those described herein.

Figure 3:
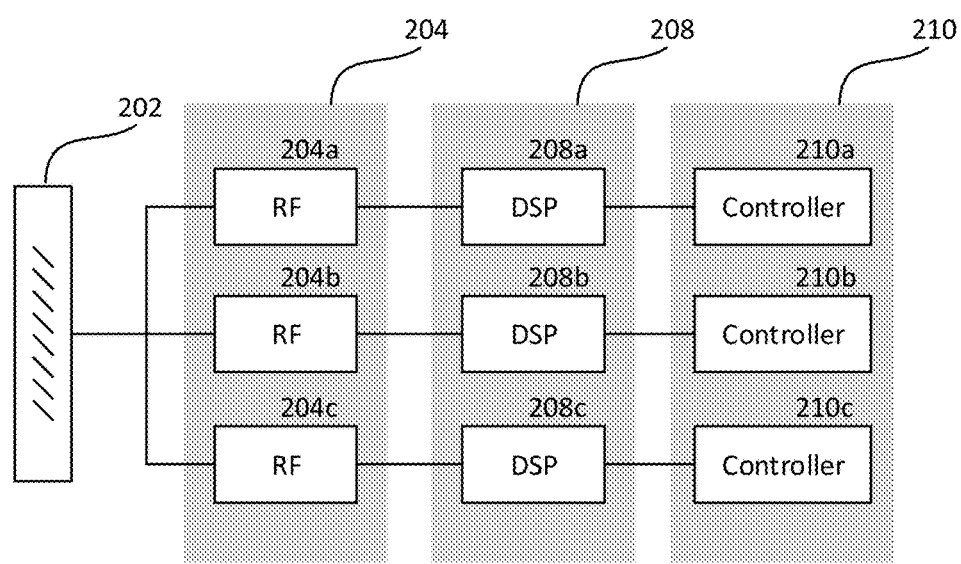
FIG. 3 shows an exemplary configuration of signal acquisition and processing circuitry according to some aspects.

FIG. 3 shows an example in which RF transceiver 204 includes RF transceiver 204a for a first radio communication technology, RF transceiver 204b for a second radio communication technology, and RF transceiver 204c for a third radio communication technology. Likewise, digital signal processor 208 includes digital signal processor 208a for the first radio communication technology, digital signal processor 208b for the second radio communication technology, and digital signal processor 208c for the third radio communication technology. Similarly, controller 210 may include controller 210a for the first radio communication technology, controller 210b for the second radio communication technology, and controller 210c for the third radio communication technology. RF transceiver 204a, digital signal processor 208a, and controller 210a thus form a communication arrangement (e.g., the hardware and software components dedicated to a particular radio communication technology) for the first radio communication technology, RF transceiver 204b, digital signal processor 208b, and controller 210b thus form a communication arrangement for the second radio communication technology, and RF transceiver 204c, digital signal processor 208c, and controller 210c thus form a communication arrangement for the third radio communication technology. While depicted as being logically separate in FIG. 4, any components of the communication arrangements may be integrated into a common component.

Terminal device 102 may also include application processor 212, memory 214, and power supply 212. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

Power supply 216 may be an electrical power source that provides power to the various electrical components of terminal device 102. Depending on the design of terminal device 102, power supply 216 may be a 'definite' power source such as a battery (rechargeable or disposable) or an 'indefinite' power source such as a wired electrical connection. Operation of the various components of terminal device 102 may thus pull electrical power from power supply 216.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios. Or, for example, terminal devices 102 or 104 may seek to switch to enhanced coverage from normal coverage if the respective network access node on which they are camped on supports enhanced coverage. By switching to enhanced coverage mode, terminal device 102 or 104 may increase the repetition in signaling with their respective network access node and/or increase signal transmission power to improve communications.

Figure 4:
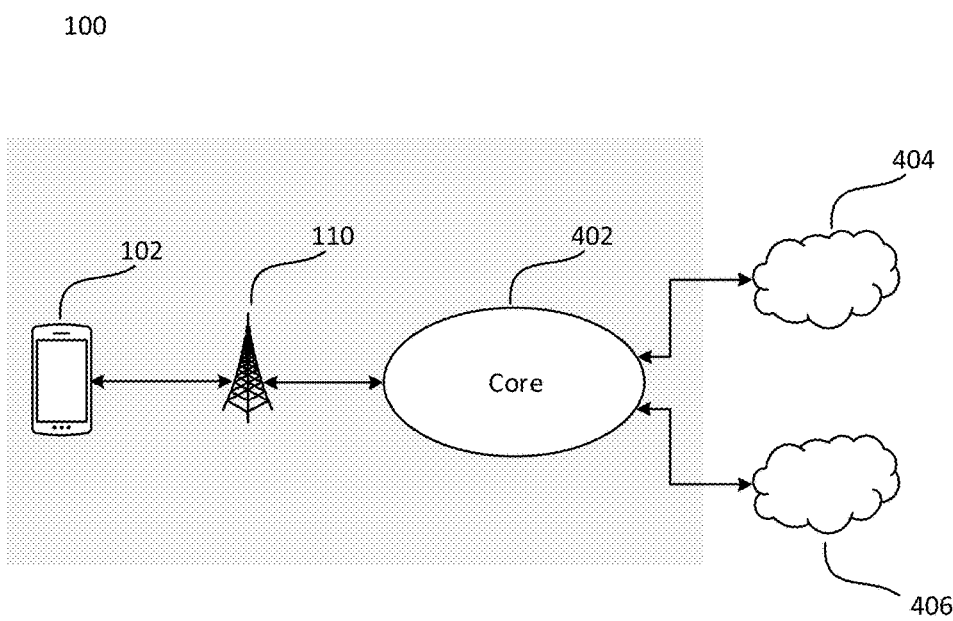
FIG. 4 shows an exemplary configuration of a network access node interfacing with core network according to some aspects.

As previously indicated, network access nodes 110 and 112 may interface with a core network. FIG. 4 shows an exemplary configuration in accordance with some aspects where network access node 110 interfaces with core network 402, which may be a cellular core network. Core network 402 may provide a variety of functions essential to operation of radio communication network 100, such as data routing, authenticating and managing users/subscribers, interfacing with external networks, and various network control tasks. Core network 402 may therefore provide an infrastructure to route data between terminal device 102 and various external networks such as data network 404 and data network 406. Terminal device 102 may thus rely on the radio access network provided by network access node 110 to wirelessly transmit and receive data with network access node 110, which may then provide the data to core network 402 for further routing to external locations such as data networks 404 and 406 (which may be packet data networks (PDNs)). Terminal device 102 may therefore establish a data connection with data network 404 and/or data network 406 that relies on network access node 110 and core network 402 for data transfer and routing.

Figure 5:
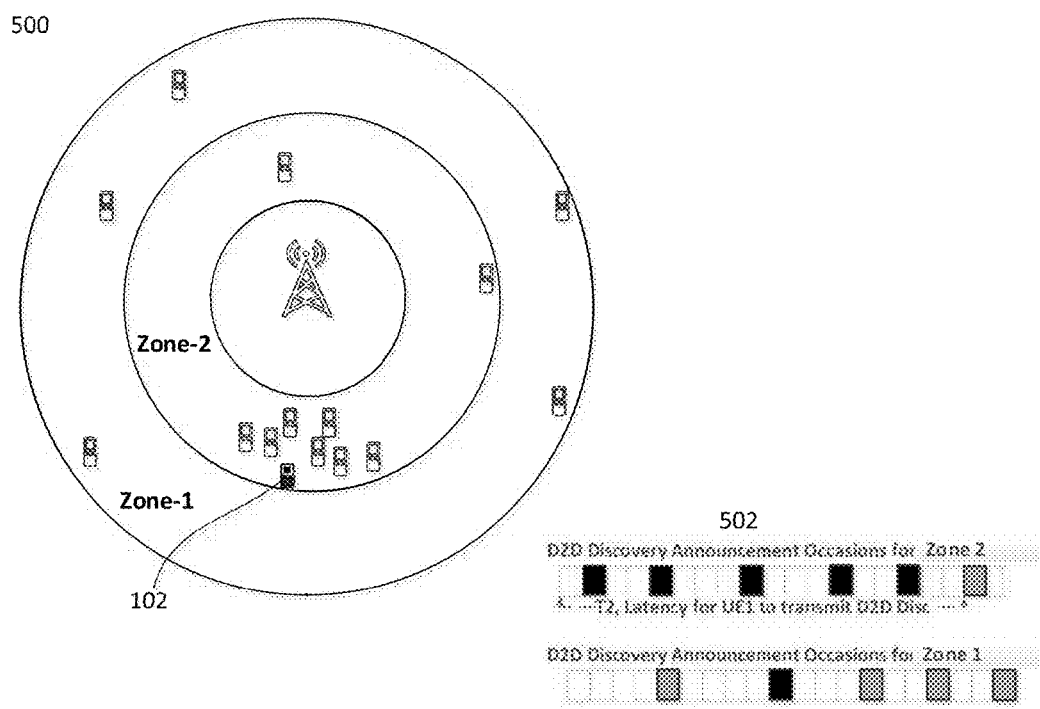
FIG. 5 shows exemplary D2D and V2X communication scenarios of cells for according to some aspects.
Figure 5:
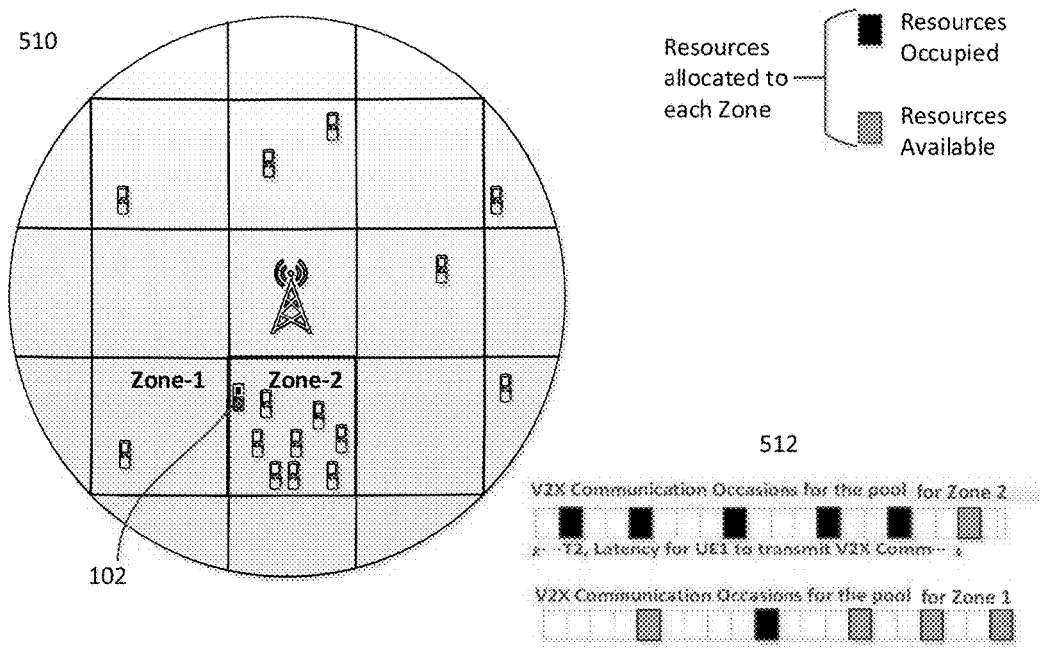

FIG. 5 shows cells 500 and 510 in some aspects. Cell 500 is illustrative of resource pool allocation for D2D discovery and cell 510 is illustrative of resource pool allocation for V2X communications. It is appreciated that these cells 500 and 510 are exemplary in nature and may thus be simplified for purposes of this explanation.

Resource allocation enhancement is one of the main technical challenges in D2D and V2X. 3GPP Releases 12 and 13 introduced two mechanisms to allow the network to allocate different resources of the frequency spectrum to each of D2D and V2X, respectively, in order to minimize interference between the two and also with other communications, e.g. LTE uplink and/or downlink. However, since the network decides the resource pool sizes and zone sizes for each of D2D and V2X communications based on long term resource requirements in a particular respective zone (i.e. once set), the zone sizes and positions are not easily modified.

Often, certain congestion scenarios cannot be managed by the network since congestion scenarios change dynamically. For example, in V2X due to a traffic jam or in D2D due to planned event.

When a particular zone is congested, the performance of the UE, and therefore the overall system, will improve if the UE is configured to identify congestion and perform resource selections from adjacent zones in a dynamic manner.

In D2D, the network divides the entire cell into regular concentric circles depending on the RSRP measured at the UE (as shown in 500). All the D2D resources in that cell are divided into N number of pools, one per each circular zone. The network assigns the common D2D discovery resources per zone by spatially dividing all available resources to reduce the chances of contention. The parameter 'SL-Pool-SelectrionConfig-r12' is broadcast by the cell in System Information Block (SIB) 19. If 'poolSelection-r12' within it is set to 'rsrpBased-r12', the UE selects resources of a pool from a list of pools the UE is configured with for which the RSRP measurement of the cell is between 'threshLow-r12' and 'threhHigh-r12.'

In V2X, the network divides the entire cell into rectangular zones according to the length and width specified in 'SL-ZoneConfig-r14' of SIB21 (as shown in 510). All of the common V2X communication resources within a cell are divided into N number of resource pools, wherein on resource pool is allocated to each zone. Thus, the network spatially divides the resources of the cell in order to reduce the possibility of contention. The UE identifies its zone depending upon its geographical coordinates (x,y) calculated according to GNSS and/or observed time difference of arrival (OTDOA) measurements and uses the resource pool according to the zone its falls within. The UE receives the zone-configuration and the resource pools from SIB21 when the UE is in RRC_IDLE or RRC_CONNECTED and from 'SL-V2X-Preconfiguration' when it is in Out-Of-Coverage.

Cell 500 shows three D2D zones: Zone 1 which is allocated a RSRP Pool 1, Zone 2 which is allocated a RSRP Pool 2, and Zone 3 which is allocated a RSRP Pool 3 (allocated by the network). The boundaries of the zones are determined by the RSRP measured at a respective communication device (e.g. UE) as received by the base station. RSRP (Reference Signal Received Power) is defined as the linear average over the power contributions of the resource elements that carry cell-specific reference signals within the considered measurement frequency bandwidth. Based on long-term resource requirements within the cell, the network determines boundaries of each of the zones. In 500, an exemplary boundary is shown dividing Zone 1 and Zone 2, which are then each allocated specific resources (e.g. time slots and/or frequency ranges) for use in D2D discovery. Because the zones are determined based on a measured RSRP from the base station, the zones resemble a series of concentric circles centered on the base station as shown in 500. Once the zone boundaries are set, these boundaries are transmitted by the base station to UEs within its cell, and thus, are strict boundaries which are largely static. In other words, the network is not configured to adjust the zone boundaries in real time to account for congestion in a particular zone. While only three zones are shown in 500, it is appreciated that there may be any number of zones determined to be best suitable by the network for D2D discovery. An exemplary allocation and user of resources for 500 is shown in 502, which illustrates D2D Discovery Announcement Occasions for each of Zone 1 (bottom) and Zone 2 (top). Each box represents a time slot in a particular frequency range (Zone 1 and Zone 2 may share the same frequency range and be allotted different time slots each, or they may be allotted different sections of the frequency spectrum).

Cell 510 shows a plurality of V2X zones as allocated by the network, with two Zones (Zone 1 and Zone 2) being chosen for purposes of this explanation. It is appreciated that these Zones are distinct from the zones described with respect to cell 500. The boundaries of each of the zones as shown in cell 510 are determined by using a Global Navigation Satellite System (GNSS), and the UEs within cell 510 determine which zone they fall into by determining their geographic position within the cell by the UE's GNSS system, e.g. Global Positioning System (GPS), Galileo, or the like.

With respect to each of cells 500 and 510, a UE 102 is located within a congested zone, i.e. Zone 2 in each of the cells. This congestion is highlighted further in 502 and 512 for cell 500 and cell 510, respectively. The shaded boxes represent the resources allocated to each respective zone, with the darker shaded boxes (i.e. black) representing resources which are occupied and the lighter shaded boxes (i.e. gray) representing resources which are available. The white boxes represent resources allocated which are not allocated to that particular zone.

As shown in each of 502 and 512, Zone 2 of each of cells 500 and 510 is highly congested, resulting in in a latency (T2) if UE 102 wants to transmit a D2D discovery signal 502 or transmit in V2X 512 in either scenario, which, for example, in V2X may prove very problematic. However, because the Zones in each of D2D and V2X cases are rigid, UE 102 will have to wait until a resource in its resource pool is available for use.

According to existing RSRP/location based resource allocation in D2D/V2X, respectively, done by the network, the UE has to choose and wait for resources within the pool allocated to its respective zone. The UE does not apply any criteria for selection of resources from the resource pool. Put differently, the network can only account for long-term resource management in each zone by optimally configuring resources in different zones. Changing these zones is expensive and time consuming as resource definitions are transmitted to the UE by SIBs.

In some aspects of this disclosure, methods and devices are configured to allow a UE (i.e. terminal device, vehicular communication device, etc.) to select resources from an adjacent zone, i.e. Zone 1 in each of cells 500 and 510, when its current resource pool (i.e. allocated to Zone 2) is congested without violating any of the standards requirements presented by 3GPP Releases 12 and 13. In other words, the methods and devices of this disclosure are configured to operate without necessitating a standards change.

Existing resource allocation mechanisms for both V2X and D2D have multiple disadvantages in congested scenarios. First, higher latency will severely impact time critical operations (e.g. V2X communications in autonomous driving). Second, there is a higher power consumption for successful transmission of the D2D discovery or V2X communication message to the receiving UEs if multiple retransmissions are required due to the high congestion (i.e. high levels of contention). Third, there will be a system wide degradation in performance. Fourth, there is no dynamic adjustment so that the network cannot efficiently handle the ever-changing resource requirement scenarios (e.g. a traffic jam, accident zone, event area, etc.) as the configuration of the zones is transmitted to UEs by system information blocks (SIBs). Fifth, the existing mechanisms are not suitable for an irregular density distribution of UEs as the zones are regular and uniform.

Figure 6:
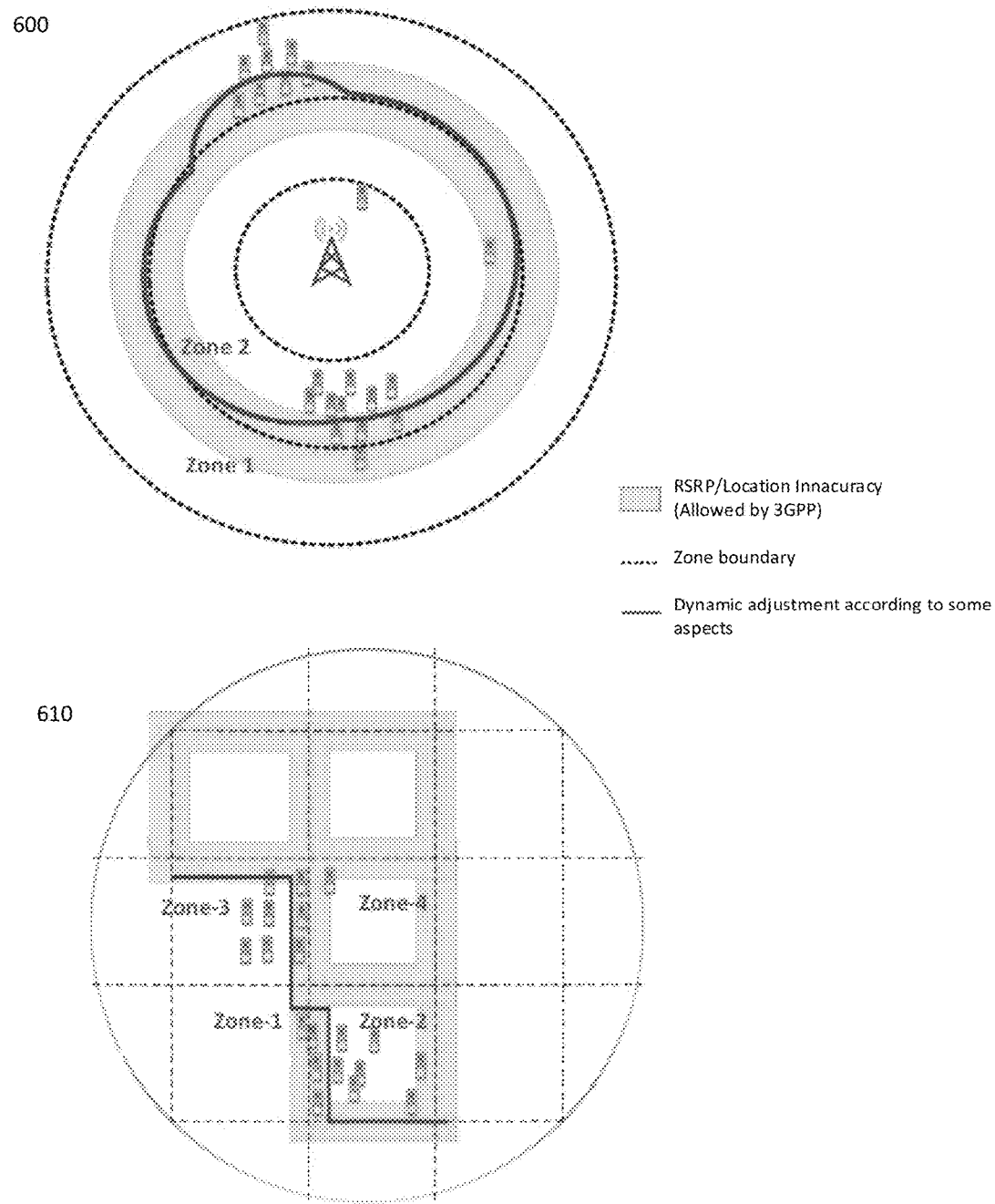
FIG. 6 shows exemplary D2D and V2X communication scenarios of cells according to some aspects.

FIG. 6 shows cells 600 and 610 according to some aspects. Cell 600 is illustrative of resource pool allocation for D2D discovery and communication network 610 is illustrative of resource pool allocation for V2X communications. It is appreciated that these networks 600 and 610 are exemplary in nature and may thus be simplified for purposes of this explanation.

As previously discussed with respect to FIG. 5, the 3GPP allocates the D2D and V2X features resource pools for discovery and communications, respectively, and divides the respective resource pools into different zones. The zones are either strictly circular (RSRP based) in D2D or strictly rectangular (location based) in V2X. The strict boundaries of the zones are set by the network through the SIBs and cannot be modified to account for dynamically changing congestion levels within the zones.

In network 600 (addressing D2D discovery) and network 602 (addressing V2X communications), the dashed lines show the respective zone boundaries sent to the UEs via the SIBs, the shaded areas show the RSRP/Location inaccuracy (i.e. deviation) allowed by the 3GPP standard, and the solid lines show the dynamic adjustment according to some aspects of this disclosure.

In some aspects, methods and devices allow for UEs (i.e. terminal devices, vehicular communication devices, etc.) to identify contention in its current zone and also in adjacent zones. The UE is configured to select from resources from a zone with a lower contention (i.e. less congestion) by exploiting an uncertainty allowed by 3GPP standards in the measurements for deciding which zone it falls within.

In some aspects, the methods and devices are configured to implement this dynamic resource selection by identifying contention in a current zone and in one or more adjacent zones (no extra monitoring is required in order to identify the contention/occupancy of its own/adjacent zones as devices have to monitor these resource pools for receiving purposes); identify if the zone with lower contention is available for selection assuming the allowed inaccuracy/deviation by 3GPP in the metric used for resource pool allocation (Examples: in D2D, a 6 dB deviation may be allowed in RSRP measurements; in V2X, 50-200 meters (m) deviation may be allowed for location measurements); and if the inaccuracy limit (amount of deviation) allows the use of a resource from one of the adjacent zones that has a lowed contention, the device is configured to use one of the adjacent resource pools for transmission (discovery signals in D2D or transmissions in V2X).

In some aspects, a device (i.e. UE, including mobile devices, vehicular communication devices, etc.) considers the allowed inaccuracy/deviation in RSRP or location measurements (depending on whether communicating via D2D or V2X), and based off the allowed inaccuracy/deviation over the measured RSRP or location, the device chooses to use resources from a resource pool in an adjacent zone which is less congested (i.e. lower contention) than its current zone.

In network 600, in a first scenario, Zone 1 is congested in the upper part of Zone 1, i.e. high contention zone, and UEs may therefore experience a delay in finding an available resource by which to transmit a D2D discovery signal. Similarly, in a second scenario, Zone 2 is congested at the bottom part of Zone 2, and the UEs there may experience a delay in finding an available resource by which to transmit a D2D discovery signal. However, by exploiting the RSRP inaccuracy allowed by the 3GPP standards, the UEs in each separate scenario are configured to dynamically adjust which zone they fall within in order to use resources of a less congested zone.

In the first scenario, one or more UEs falling within the area of measurement inaccuracy (the shaded region) may use resources from Zone 2 in order to avoid latency in D2D discovery signal transmission. In other words, since the resources of Zone 1 are highly contended due to a high level of traffic in Zone 1, one or more UEs close enough to the boundary with Zone 2 (e.g. within 6 dBs of the measured RSRP of Zone 2) may use Zone 2 resources (i.e. frequency resources) in order to reduce the latency of their D2D discovery signals. By doing using Zone 2 resources, there is also the additional benefit that Zone 1 resources are freed up, thus freeing up resources for use to those UEs that do not fall within the inaccuracy region. In this example, the resources allocated to Zone 2 are expanded to UEs within Zone 1.

In the second scenario, Zone 2 the highly congested zone. Accordingly, one or more UEs close enough to the boundary with Zone 1 (e.g. within 6 dBs of the measured RSRP of Zone 2) may use Zone 1 resources in order to reduce the latency of their D2D discovery signals. In this example, the resources allocated to Zone 1 are expanded to UEs within Zone 2.

The network cannot increase or reduce the coverage of a zone at a specific location, it can only adjust the radius allowed by RSRP measurements for a whole zone, and then set this radius and transmit this information through SIBs, which are both costly and time consuming to modify. However, the advantages of the dynamic adjustment of which zones the UEs fall within is that the adjustments are UE based, thus allowing for increasing or reduce the coverage of a zone at a specific location based on the UE density (i.e. contention) in real-time.

In network 610, both Zones 2 and 3 are high contention zones, and the UEs (i.e. vehicular communication devices) may therefore experience a delay in finding an available resource from the resource pool allocated to its respective Zone to transmit a V2X communication. However, by exploiting the location inaccuracy allowed by the 3GPP standards, one or more UEs are configured to dynamically adjust which zone they fall within in order to use resources of a less congested zone, i.e. Zone 1 and Zone 4.

For example, with respect to Zone 3, one or more UEs falling within the location measurement inaccuracy region along Zone 4 (e.g. within 50-200 meters) may use Zone 4 resources in order to reduce the chances that it will experience contention in transmitting a V2X communication. In this case, the resource pool allotment of Zone 4 is expanded to include one or more UEs within Zone 3, which also frees up the resource pool for use for one or more UEs that are not within the measurement inaccuracy region. In this example, the resources allocated to Zone 4 are expanded to UEs within Zone 3.

Similarly, with respect to Zone 2, one or more UEs falling within the location measurement inaccuracy region along Zone 1 (e.g. within 50-200 meters) may use Zone 1 resources in order to reduce the chances that it will experience contention in transmitting a V2X communication. In this case, the resource pool allotment of Zone 1 is expanded to be used by one or more UEs within Zone 2, which also frees up the resource pool for use for one or more UEs that are not within the measurement inaccuracy region. In this example, the resources allocated to Zone 1 are expanded to UEs within Zone 2.

With respect to all of the scenarios described above, it is important to note that the zone boundaries as set by the SIBs are not modified. While the zone boundaries stay the same, the UEs are configured to "borrow" a neighboring zone's resources in order to decrease the likelihood of contention. The advantages of this disclosure over the existing methods presented by the 3GPP standard are shown in Table 1.

TABLE 1

| According to 3GPP | According to this disclosure |
|---|---|
| Zone size and resources per zone cannot be adjusted quickly since boundaries set by SIBs | UE can select resource(s) from an adjacent zone, resulting in dynamic adjustment of zone resources |
| Adjustment of zones is expensive since changing the SIBs affects the whole network since each UE has to decode the SIBS again | No adjustment of zones defined by the SIBs is required |
| For D2D, the radius of the whole zone has to be updated; location specific adjustment is not possible | UE(s) identifies congested areas near zone boundaries and dynamically selects resources from an adjacent zone's resource pool as shown in FIG. 6 |
| For V2X, the horizontal/vertical coordinates of all zones are modified/set together | |

Dynamic adjustment of the resources by the UE (e.g. mobile phones, vehicular communication devices, etc.) can arise in several scenarios, e.g. for D2D, change in user density due to sports or music events; for V2X, change in user density due to traffic, accidents, or construction. By implementing the methods and algorithms of this disclosure, better resource mapping for dynamically reacting to congestion scenarios at the device results in: lower latency for time critical applications in both D2D and V2X; device power savings attributed to less retransmissions; increase in overall system (network) performance without modification of system parameters from the base station (e.g. no modification of SIBs from eNodeB). Table 2 is includes several exemplary conditions for where the devices and methods of this disclosure may be used.

TABLE 2

| Technology | UE condition | RRC Mode | 3GPP Release |
|---|---|---|---|
| D2D V2X | UE is within allowed measurement inaccuracy/ deviation range to the zone boundary | Idle, Connected Idle, Connected, Out of Coverage | Release 12, Release 13, and subsequent releases |

Figure 7:
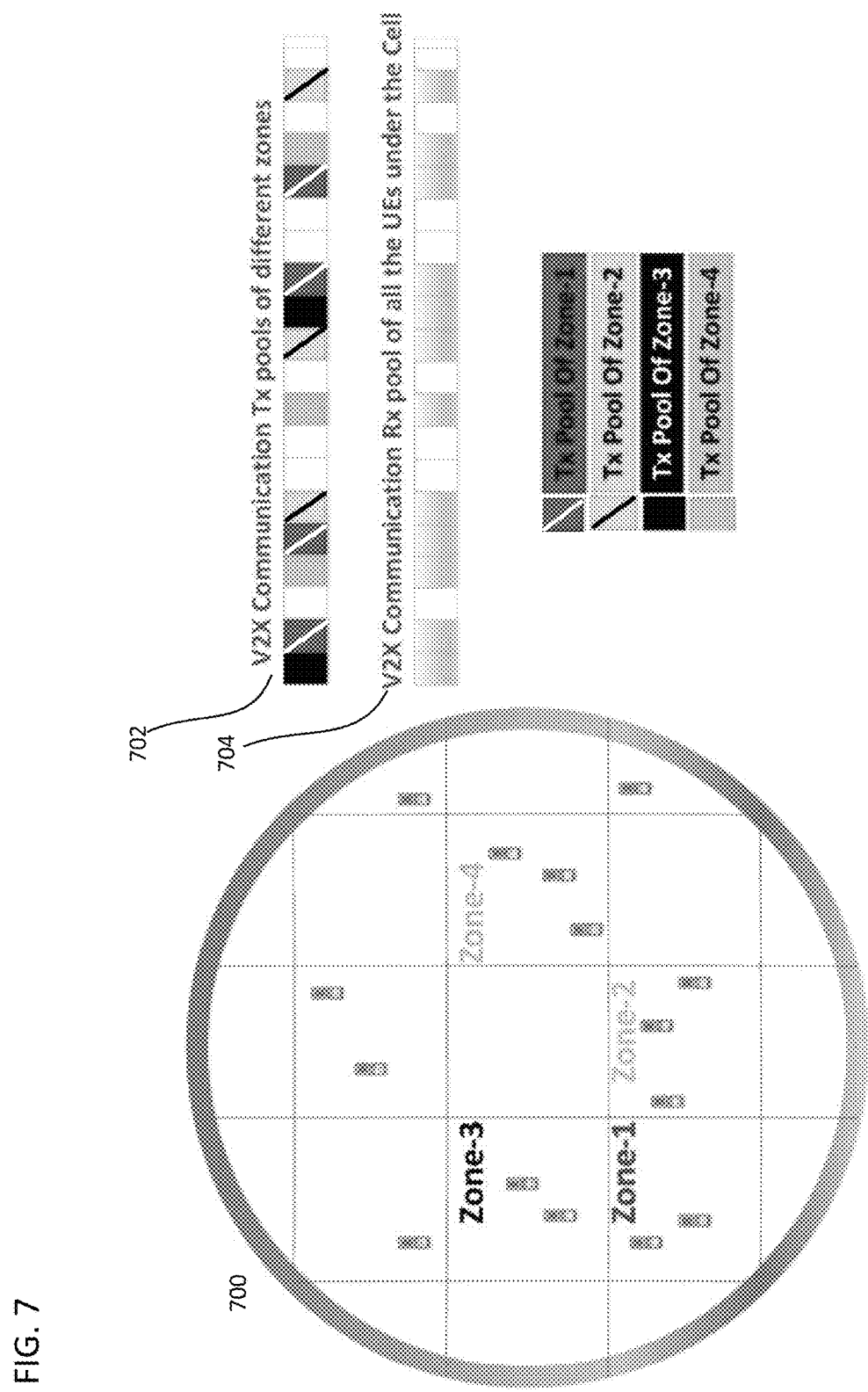
FIG. 7 shows an exemplary V2X scenario for identifying contention according to some aspects.

FIG. 7 shows a scenario for a cell 700 illustrating the identification of contention in one or more zones by a UE. While the scenario shown in FIG. 7 depicts the identification of contention for V2X scenarios (note: the rectangular shapes of the zones), it is appreciated that the identification of contention for D2D scenarios is similarly implemented (for circular shaped zones).

In some aspects, devices and methods are configured to identify a contention, and based off the contention in the current zone, use the transmission resources (i.e. frequency resources) from an adjacent pool among all the pools found to be within the allowed measurement inaccuracy. In both D2D and V2X, the receive (Rx) resource pool constitutes the union of all the transmit (Tx) resource pools under the serving cell and the adjacent cells. Therefore, a UE monitors all the Tx pools under that serving cell. The Rx UE can therefore maintain a history of the percentage of occupancy of its own zone's Tx pool as well as the adjacent zone's Tx pool in order to compare the contention between the two zones. And depending on the amount of resources the UE requires for transmitting a D2D Discovery message or a V2X communication message, the UE, according to the methods and algorithms of this disclosure, is configured to choose a zone with a lower percentage of occupancy in the (very) recent history (note: also taking into account if the UE is within the measurement inaccuracy range to the adjacent zone).

The Tx resource pools of Zones 1-4 in cell 700 are shown in 702, wherein the overall Rx pool of all the UE in cell 700 is shown in 704. The Rx pool 704 is the sum of all of the Tx resource pools 702 from all of the zones (only 4 zones are shown in FIG. 7 for purposes of this explanation). No standardization changes are needed for the identification of congested zones as the adjacent pools are only used when the allowed inaccuracy of the position (or RSRP) satisfies the condition to use the adjacent resource pools.

Figure 8:
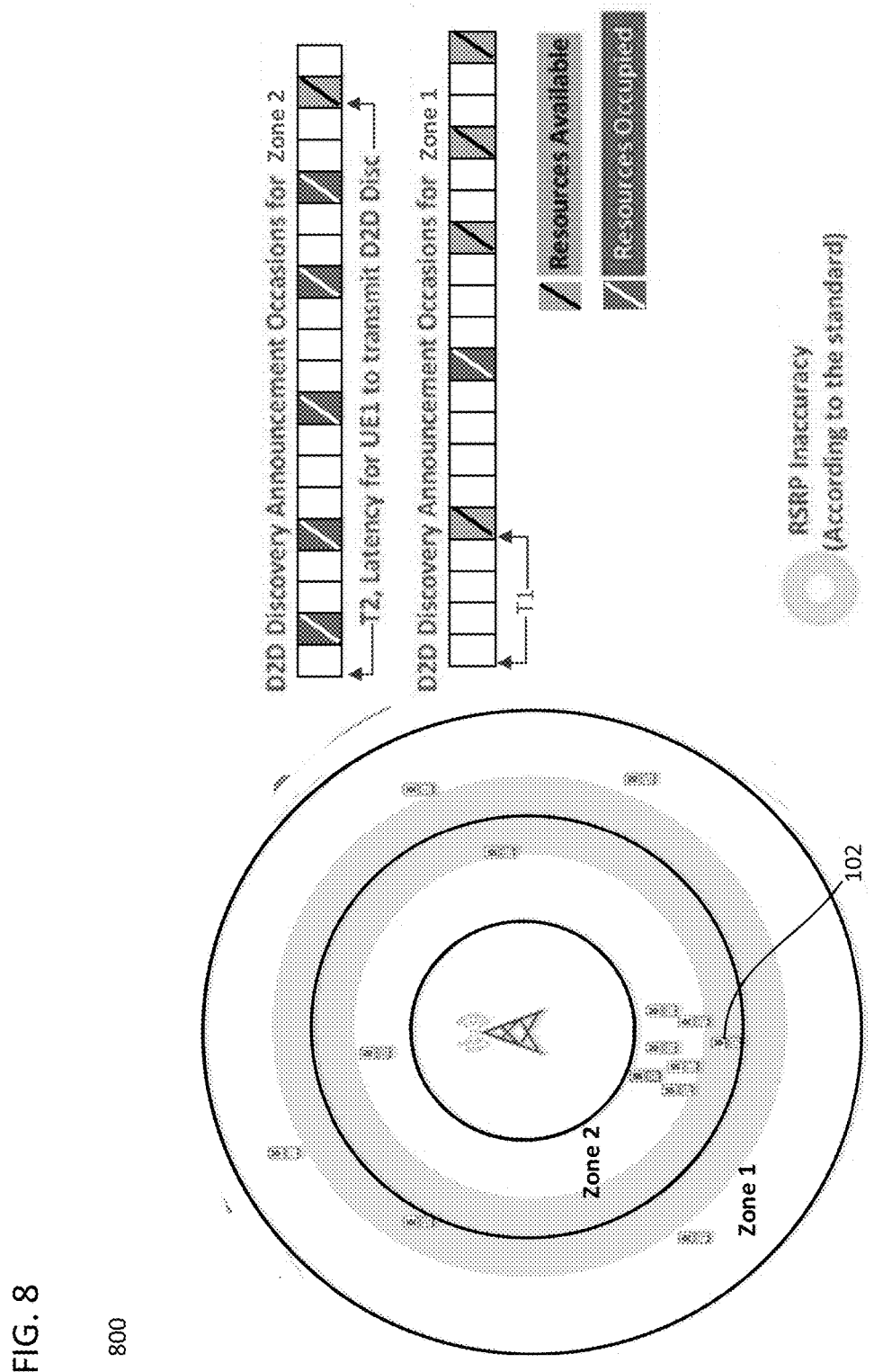
FIG. 8 shows an exemplary D2D Discovery scenario according to some aspects.

FIG. 8 shows an exemplary D2D Discovery scenario for a UE 102 in a cell 800 according to some aspects. After performing the RSRP measurements and receiving the zone boundary parameters in the SIBs, UE 102 may determine that it is to draw from resources in Zone 2. However, after determining a high level of contention in its current Zone (i.e. Zone 2) and by considering the RSRP inaccuracy allowed by the standard (shown in the shaded region between Zones 1 and 2), UE 102 is configured to use resources from the adjacent zone, i.e. Zone 1, after determining a lower chance of contention in the zone based off of an analysis of that zone's recent history (stored by the UE).

In other words, after determining that it falls within the RSRP inaccuracy region between Zone 1 and Zone 2, UE 102 can use the resources of the zone with a lower contention, even if the zone is not its originally assigned zone. The benefit of this is illustrated in the D2D Discovery Announcement Occasion charts for Zones 1 and 2 in FIG. 8. The latency of using the first available resource in Zone 2 is T2, which is much greater than the latency of using the first available resource in Zone 1, i.e. T1.

Figure 9:
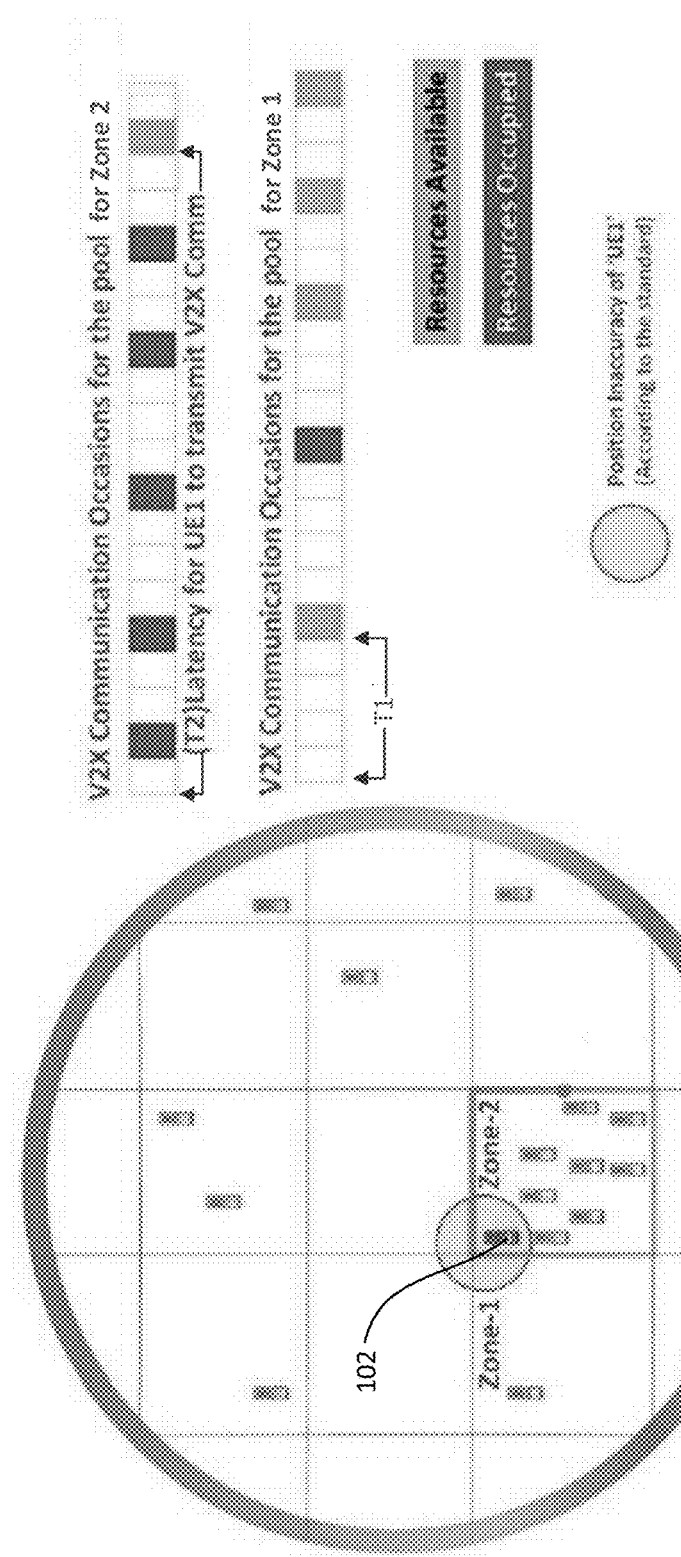
FIG. 9 shows an exemplary V2X communication scenario according to some aspects.

FIG. 9 shows an exemplary V2X communication scenario for a UE 102 in a cell 900 according to some aspects. After determining its position (e.g. by GNSS signals) and receiving the cell zone boundary parameters broadcast in the SIBs, UE 102 may determine that it falls within Zone 2, and draw resources from the resources allocated to that zone. However, after determining a high level of contention in its current Zone (i.e. Zone 2) and by considering the location inaccuracy allowed by the standard (shown in the shaded circular region around UE 102), UE 102 is configured to use resources from an adjacent zone, i.e. Zone 1, after determining a lower chance of contention in the zone based off of an analysis of that zone's recent history (stored by the UE).

The benefit of this is illustrated in the V2X Communication Occasions charts for Zones 1 and 2 in FIG. 9. The latency of using the first available resource in Zone 2 is T2, which is much greater than the latency of using the first available resource in Zone 1, i.e. T1.

Figure 10:
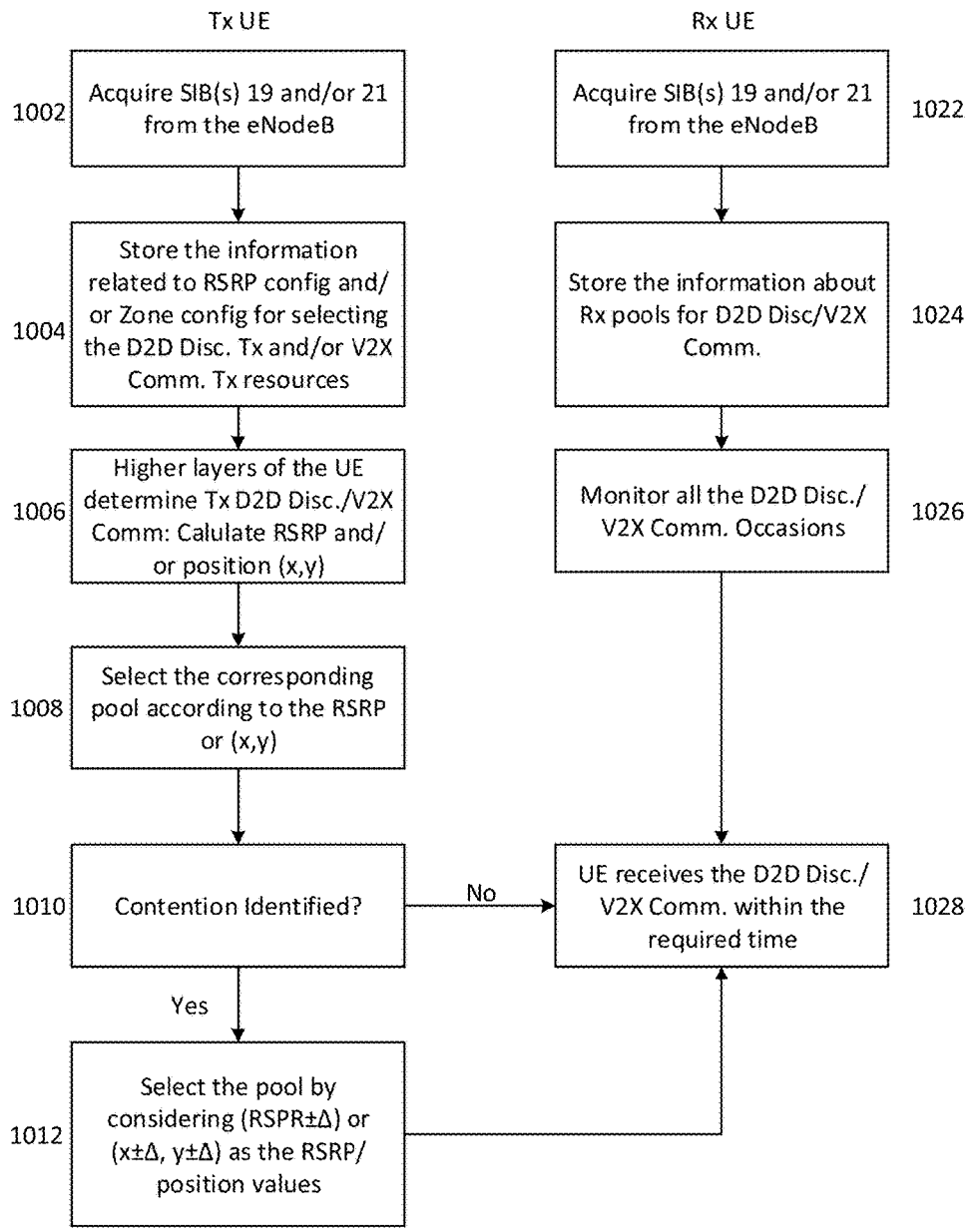
FIG. 10 shows an exemplary flowchart illustrating the process by which a device is configured to transmit a message to according to some aspects.

FIG. 10 is an exemplary flowchart 1000 illustrating the process by which a Tx UE is configured to monitor for contention and dynamically select resources from an adjacent zone in order to transmit a message to a Rx UE is some aspects. The process from the Tx UE's perspective is shown in 1002-1012 and the process from the Rx UE's perspective is shown in 1022-1028. It is appreciated that the method may be described with D2D and V2X either independently of each other or in combination, e.g. only for D2D or only for V2X, or some combination of the two for a UE potentially configured to communicate via both V2X and D2D.

After selecting and camping on a cell, the Rx UE acquires the SIBs broadcast from the cell (i.e. eNodeB), including SIB 19 (containing information related to D2D) and/or SIB 21 (containing information related to V2X) 1022 (depending on whether the UE is configured for D2D and/or V2X). The Rx UE stores the information about the Rx pools for D2D Discovery and/or V2X communications 1024, which is the combination of all of the Tx pools as configured by the base station (e.g. eNodeB). The Rx UE then monitors the D2D Discovery and/or V2X communication occasions 1026 as indicated by the Rx pools.

In 1002, the Tx UE acquires the SIBs broadcast from the cell (i.e. eNodeB), including SIB 19 (containing information related to D2D) and/or SIB 21 (containing information related to V2X), depending on whether the UE is configured for D2D and/or V2X. The information related to RSRP Configurations (for D2D Discovery) and/or Zone configurations (for V2X communications) for selecting which of the respective zones the UE falls within in order to use that respective zone's resources is stored 1004. Then, the UE determines which zone it falls within for at least one of D2D or V2X communications by calculating the RSRP and/or position (x, y), respectively 1006. The UE then selects the resource pool allocated to its determined zone according to the measure RSRP or position (x,y) 1008. The Tx UE identifies if there is any contention in the resource pool of its current zone 1010. The UE may do this by monitoring a resource pool of at least one of its current zone, or one or more adjacent zones, for a pre-determined time in order to make a proper assessment. If the UE does not identify any contention, it is free to transmit the message according to currently existing methods, in which case the Rx UE receives the D2D Discover or V2X Communication message within the required time, i.e. at low latency 1028. If, however, the Tx UE identifies contention in the resource pool of the current zone (e.g. by determining that a high percentage of resources were/are occupied), the UE is determined to select a resource pool from an adjacent zone considering (RSPR±Δ) or (x±Δ, y±Δ) as the RSRP or position values, respectively, 1012, where Δ is the allowed measurement inaccuracy allowed by 3GPP standards. In addition, the contention of the adjacent zone may be measure as well and compared to the Tx UE's current zone (not shown in Figure), prior to the Tx UE selecting the resource pool from the adjacent zone for transmission. In either case, upon selecting the resource pool from the adjacent zone for transmission, the Tx UE transmits the message to the Rx UE, which receives the D2D Discover or V2X Communication message within the required time, i.e. at low latency, 1028.

The method shown in flowchart 1000 provides improvements over existing methods by providing mechanisms for contention identification and exploiting the measurement deviation allowed by 3GPP standards to select resources from an adjacent zone in order to more efficiently transmit messages in D2D Discovery and V2X Communications.

Figure 11:
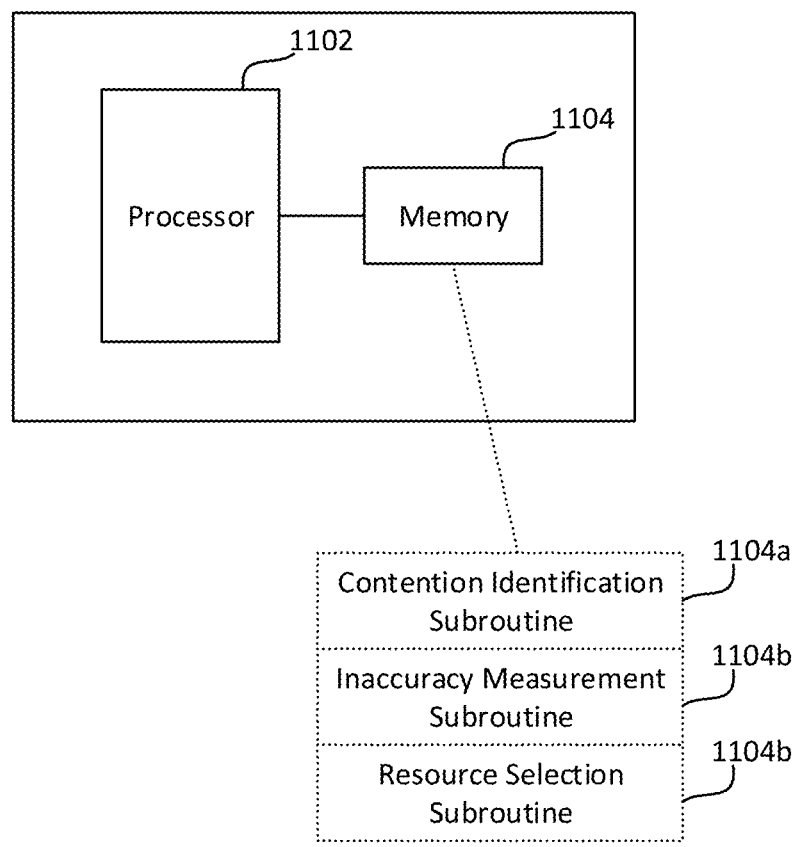
FIG. 11 shows a schematic diagram of a device controller with subroutines stored in a memory according to some aspects.

FIG. 11 is a schematic diagram of a terminal device (i.e. UE) controller 210 according to some aspects. It is appreciated that controller 210 is exemplary in nature and may thus be simplified for purposes of this explanation.

As shown in FIG. 11, controller 210 may include processor 1102 and memory 1104. Processor 1102 may be a single processor or multiple processors, and may be configured to retrieve and execute program code to perform the transmission and reception, channel resource allocation, and cluster management as described herein. Processor 1102 may transmit and receive data over a software-level connection that is physically transmitted as wireless signals or over physical connections. Memory 1104 may be a non-transitory computer readable medium storing instructions for one or more of a contention identification subroutine 1104a, an inaccuracy (i.e. deviation) measurement subroutine 1104b, and a resource selection subroutine 1104c.

Contention identification subroutine 1104a, inaccuracy measurement subroutine 1104b, and resource selection subroutine 1104c may each be an instruction set including executable instructions that, when retrieved and executed by processor 1102, perform the functionality of controller 210 as described herein. In particular, processor 1102 may execute contention identification subroutine 1104a to identify contention in resources of at least one of a current zone and/or one or more adjacent zones, and, in some aspects, compare the contention in resources of the different zones; processor 1102 may execute inaccuracy measurement subroutine 1104b to determine whether the terminal device (i.e. UE, e.g. vehicular communication device) falls within an adjacent zone determined from an allowed measurement inaccuracy (e.g. a deviation value in the position of the device and/or in the boundaries of the zones); and processor 1102 may execute resource selection subroutine 1104c to select resources from a zone to transmit a message. Resource selection subroutine 1104c may include instructions for comparing two zones (e.g. a current zone and an adjacent zone) and determining which of the two has a lower contention. While shown separately within memory 1104, it is appreciated that two or more of subroutines 1104a-1104c may be combined into a single subroutine exhibiting similar total functionality, e.g. inaccuracy measurement subroutine 1104b and resource selection subroutine 1104c may be merged together into a single subroutine for identifying adjacent zones and selecting the resources from the adjacent zone. By executing subroutines 1104a-1104c, a UE is able to improve the performance in transmitting messages in high contention scenarios.

Figure 12:
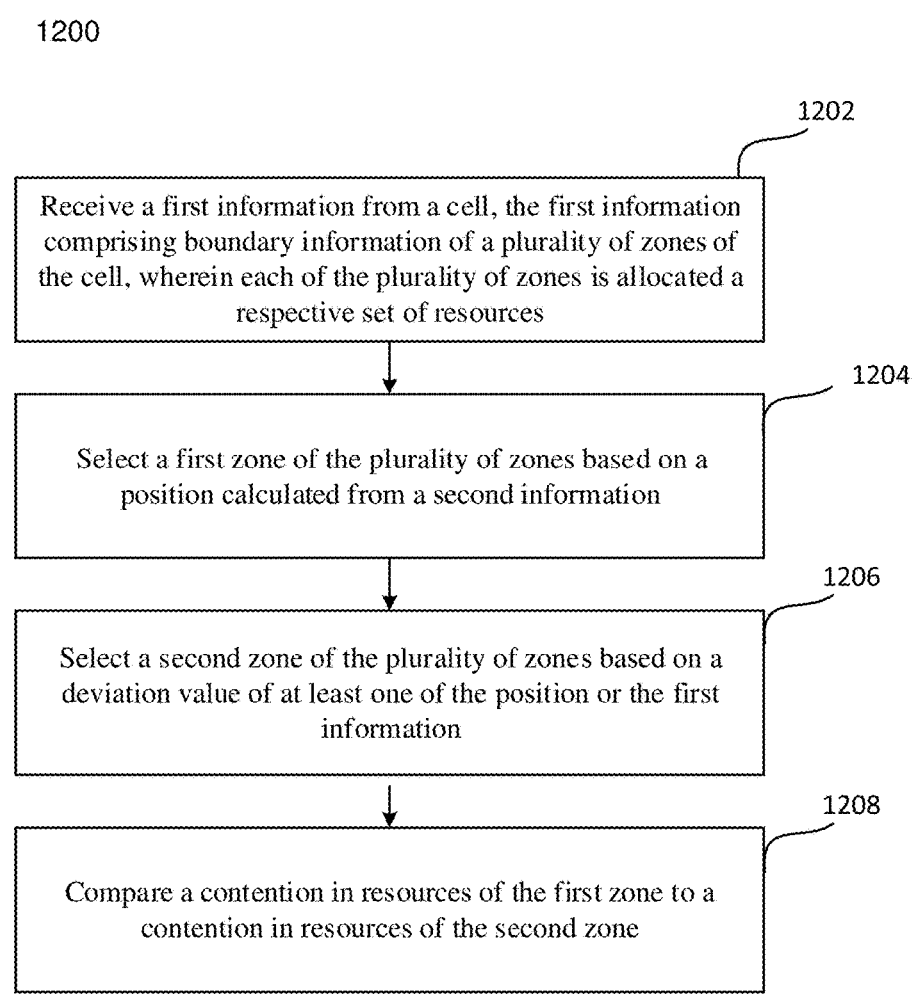
FIG. 12 shows an exemplary flowchart detailing a method according to some aspects.

FIG. 12 is a flowchart 1200 according to some aspects. It is appreciated that flowchart 1200 is exemplary in nature and may thus be simplified for purposes of this explanation.

In 1202, a first information is received from a cell, the first information comprising boundary information of a plurality of zones of the cell, wherein each of the plurality of zones is allocated a respective set of resources. The boundary information may comprise either RSRP values (for D2D) and/or geographic coordinates (e.g. (x.y) coordinates determined from GPS). The first information, for example, may be SIBs, including at least one of SIB 19 and/or SIB 21 with information regarding D2D Discovery and V2X communications, respectively.

In 1204, a first zone of the plurality of zones is selected based on a position calculated from a second information. The second information may comprise an RSRP signal received from a base station (eNodeB) and measured at the communication device, or a geographic position determined from GNSS signals or terrestrial triangulation methods.

In 1206, a second zone of the plurality of zones is selected based on a deviation value of at least one of the position or the first information. For example, this may include determining whether a device is near a boundary with an adjacent zone and within an allowed measurement inaccuracy as defined by 3GPP standards for determining which zone the device falls within.

In 1208, a comparison of a contention in resources of the first zone to a contention in resources of the second zone is performed. This may include monitoring each of the usage percentage of a respective zones resources for a predetermined amount of time in order to assess which zone has a lower chance of having its resources contested for use for transmitting a signal.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a communication device including one or more processors configured to receive a first information from a cell, the first information comprising boundaries of a plurality of zones of the cell, wherein each of the plurality of zones is allocated a respective set of resources; select a first zone of the plurality of zones based on a position calculated from a second information; select a second zone of the plurality of zones based on a deviation value of at least one of the position or the first information; compare a contention in resources of the first zone to a contention in resources of the second zone; and transmit a message based on the comparison.

In Example 2, the subject matter of Example(s) 1 may include the comparison including determining which of the first zone or the second zone has a lower contention.

In Example 3, the subject matter of Example(s) 2 may include wherein the message is transmitted using the resources of the zone with the lower contention.

In Example 4, the subject matter of Example(s) 1-3 may include wherein the contention in resources of the first zone and the contention in resources of the second zone comprises monitoring each respective zone's usage of resources.

In Example 5, the subject matter of Example(s) 4 may include wherein the monitoring is performed for a predetermined time.

In Example 6, the subject matter of Example(s) 1-5 may include wherein the first information comprises one or more System Information Blocks (SIBs).

In Example 7, the subject matter of Example(s) 6 may include wherein one of the one or more SIBs is SIB 19.

In Example 8, the subject matter of Example(s) 1-7 may include wherein the boundaries of the plurality of zones are based on reference signal received power (RSRP) measurements.

In Example 9, the subject matter of Example(s) 8 may include the second information determined from a received reference signal.

In Example 10, the subject matter of Example(s) 9 may include the one or more processors configured to measure the RSRP of the received reference signal.

In Example 11, the subject matter of Example(s) 10 may include the one or more processors configured to determine the position based on the RSRP measurement of the received reference signal.

In Example 12, the subject matter of Example(s) 11 may include wherein boundaries of the first zone include an RSRP value higher than the RSRP measurement and an RSRP value lower than the RSRP measurement.

In Example 13, the subject matter of Example(s) 7-12 may include wherein the deviation value is about 6 decibels.

In Example 14, the subject matter of Example(s) 1-13 may include wherein the message is a Device to Device (D2D) discovery message.

In Example 15, the subject matter of Example(s) 6-14 may include wherein one of the one or more SIBs is SIB 21.

In Example 16, the subject matter of Example(s) 1-15 may include wherein the boundaries of the plurality of zones are based on geographical coordinates.

In Example 17, the subject matter of Example(s) 16 may include the second information determined a geographical position measurement.

In Example 18, the subject matter of Example(s) 17 may include the geographical position measurement comprising receiving one or more Global Navigation Satellite System (GNSS) signals, and determining the position based on the received GNSS signals.

In Example 19, the subject matter of Example(s) 17 may include the geographical position measurement being determined by triangulation of signals received from terrestrial devices.

In Example 20, the subject matter of Example(s) 17-19 may include the one or more processors configured to determine the position based on the geographical position measurement.

In Example 21, the subject matter of Example(s) 16-20 may include wherein the deviation value is about 50 meters to about 200 meters.

In Example 22, the subject matter of Example(s) 1-21 may include wherein the message is a Vehicle to Everything (V2X) communication.

In Example 23, a method for transmitting a message in wireless communications, the method including receiving a first information from a cell, the first information comprising boundaries of a plurality of zones of the cell, wherein each of the plurality of zones is allocated a respective set of resources; selecting a first zone of the plurality of zones based on a position calculated from a second information; selecting a second zone of the plurality of zones based on a deviation value of at least one of the position or the first information; comparing a contention in resources of the first zone to a contention in resources of the second zone; and transmitting the message based on the comparison.

In Example 24, the subject matter of Example(s) 23 may include the comparison including determining which of the first zone or the second zone has a lower contention.

In Example 25, the subject matter of Example(s) 24 may include transmitting the message using the resources of the zone with the lower contention.

In Example 26, the subject matter of Example(s) 23-25 may include monitoring the resources in the first zone and the resources in the second zone to determine each respective zone's contention of resources.

In Example 27, the subject matter of Example(s) 26 may include performing the monitoring for a predetermined time.

In Example 28, the subject matter of Example(s) 23-27 may include wherein the first information comprises one or more System Information Blocks (SIBs).

In Example 29, the subject matter of Example(s) 28 may include wherein one of the one or more SIBs is SIB 19.

In Example 30, the subject matter of Example(s) 23-29 may include wherein the boundaries of the plurality of zones are based on reference signal received power (RSRP) measurements.

In Example 31, the subject matter of Example(s) 30 may include determining the second information determined from a received reference signal.

In Example 32, the subject matter of Example(s) 31 may include measuring the RSRP of the received reference signal.

In Example 33, the subject matter of Example(s) 32 may include determining the position based on the RSRP measurement of the received reference signal.

In Example 34, the subject matter of Example(s) 33 may include wherein boundaries of the first zone include an RSRP value higher than the RSRP measurement and an RSRP value lower than the RSRP measurement.

In Example 35, the subject matter of Example(s) 29-34 may include wherein the deviation value is about 6 decibels.

In Example 36, the subject matter of Example(s) 29-35 may include wherein one of the one or more SIBs is SIB 21.

In Example 37, the subject matter of Example(s) 23-36 may include wherein the boundaries of the plurality of zones are based on geographical coordinates.

In Example 38, the subject matter of Example(s) 37 may include determining the second information based on a geographical position measurement.

In Example 39, the subject matter of Example(s) 38 may include the geographical position measurement comprising receiving one or more Global Navigation Satellite System (GNSS) signals, and determining the position based on the received GNSS signals.

In Example 40, the subject matter of Example(s) 38-39 may include the geographical position measurement being determined by triangulation of signals received from terrestrial devices.

In Example 41, the subject matter of Example(s) 38-40 may include the one or more processors configured to determine the position based on the geographical position measurement.

In Example 42, the subject matter of Example(s) 38-41 may include wherein the deviation value is about 50 meters to about 200 meters.

In Example 43, one or more non-transitory computer-readable media storing instructions thereon that, when executed by at least one processor, direct the at least one processor to perform a method or realize a device as claimed in any preceding Example.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising at least one processor configured to:
   receive a first information from a cell, the first information comprising boundaries of a plurality of zones of the cell, wherein each of the plurality of zones is allocated a respective set of resources;
   select a first zone of the plurality of zones based on a position calculated from a second information;
   select a second zone of the plurality of zones based on a deviation value of the first information, wherein the deviation value is indicative of a range to a boundary between at least the first zone and the second zone;
   compare a contention in resources of the first zone to a contention in resources of the second zone; and
   transmit a message based on the comparison.

2. The communication device of claim 1, the comparison comprising determining which of the first zone and the second zone has a lower contention, wherein the message is transmitted using resources of the zone with the lower contention.

3. The communication device of claim 1, wherein the contention in resources of the first zone and the contention in resources of the second zone comprises monitoring each respective zone's usage of resources.

4. The communication device of claim 1, wherein the boundaries of the plurality of zones are based on reference signal received power (RSRP) measurements.

5. The communication device of claim 4, the second information determined from a received reference signal.

6. The communication device of claim 5, the at least one processor configured to determine the position based on the RSRP measurement of the received reference signal.

7. The communication device of claim 4, wherein the deviation value is about 6 decibels.

8. The communication device of claim 1, wherein the boundaries of the plurality of zones are based on geographical coordinates.

9. The communication device of claim 8, the second information determined a geographical position measurement.

10. The communication device of claim 9, the geographical position measurement comprising receiving one or more Global Navigation Satellite System (GNSS) signals, and determining the position based on the received GNSS signals.

11. The communication device of claim 9, wherein the deviation value is about 50 meters to about 200 meters.

12. A method for transmitting a message in wireless communications, the method comprising:
    receiving a first information from a cell, the first information comprising boundaries of a plurality of zones of the cell, wherein each of the plurality of zones is allocated a respective set of resources;
    selecting a first zone of the plurality of zones based on a position calculated from a second information;
    selecting a second zone of the plurality of zones based on a deviation value of the first information, wherein the deviation value is indicative of a range to a boundary between at least the first zone and the second zone;
    comparing a contention in resources of the first zone to a contention in resources of the second zone; and
    transmitting the message based on the comparison.

13. The method of claim 12, further comprising determining which of the first zone or the second zone has a lower contention and transmitting the message using the resources of the zone with the lower contention.

14. The method of claim 12, further comprising monitoring the resources in the first zone and the resources in the second zone to determine each respective zone's contention of resources.

15. The method of claim 12, wherein the boundaries of the plurality of zones are based on reference signal received power (RSRP) measurements.

16. The method of claim 15, further comprising determining the second information determined from a received reference signal.

17. The method of claim 12, wherein the boundaries of the plurality of zones are based on geographical coordinates.

18. The method of claim 17, further comprising determining the second information based on a geographical position measurement.

19. One or more non-transitory computer-readable media storing instructions thereon that, when executed by at least one processor of a communication device, direct the communication device to perform a method comprising:
    receiving a first information from a cell, the first information comprising boundaries of a plurality of zones of the cell, wherein each of the plurality of zones is allocated a respective set of resources;
    selecting a first zone of the plurality of zones based on a position calculated from a second information;
    selecting a second zone of the plurality of zones based on a deviation value of the first information, wherein the deviation value is indicative of a range to a boundary between at least the first zone and the second zone;
    comparing a contention in resources of the first zone to a contention in resources of the second zone; and
    transmitting the message based on the comparison.

20. The one or more non-transitory computer-readable media of claim 19, further comprising determining which of the first zone or the second zone has a lower contention and transmitting the message using the resources of the zone with the lower contention.

\* \* \* \* \*